March 25, 1947. I. NESSON 2,417,991
WINDSHIELD WIPER ARM
Filed Dec. 10, 1943 2 Sheets-Sheet 1
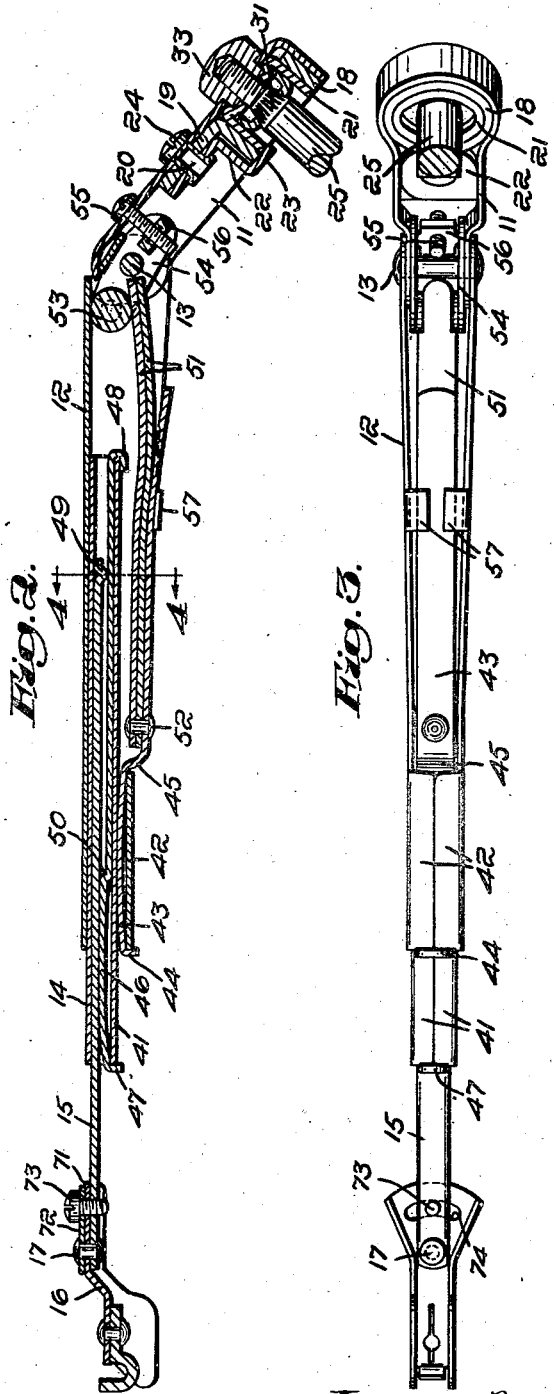
Inventor:
Israel Nesson,
by Thomson & Thomson Attorneys

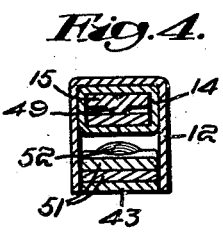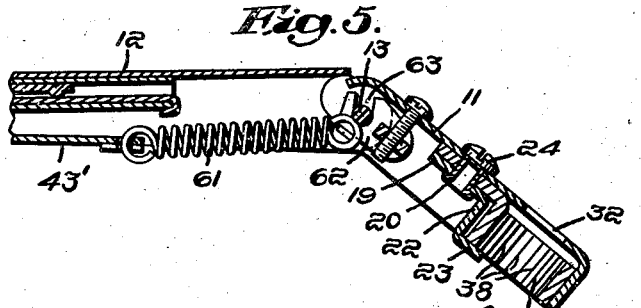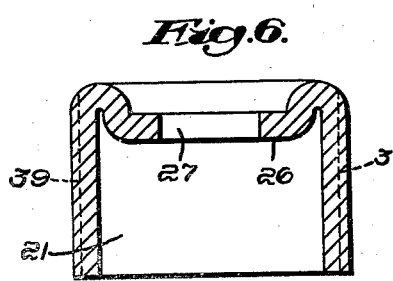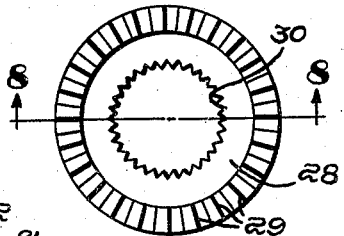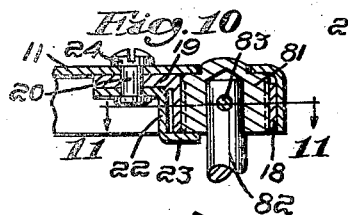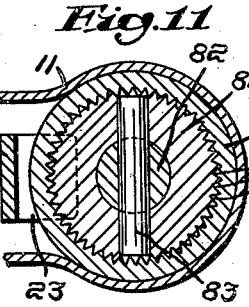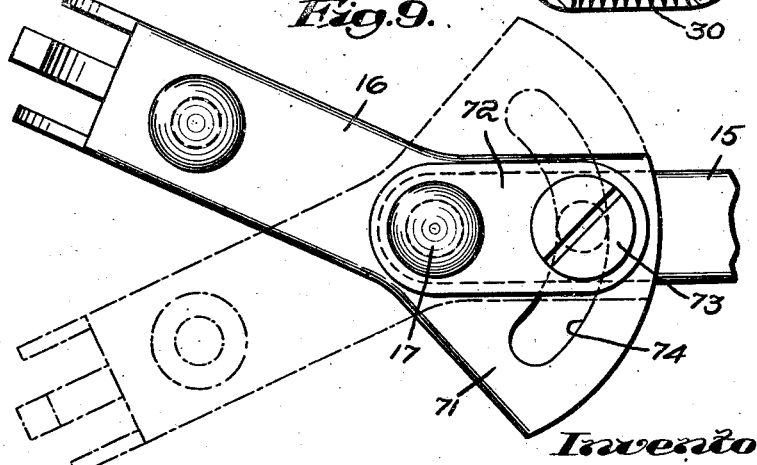

Patented Mar. 25, 1947

2,417,991

UNITED STATES PATENT OFFICE 2,417,991

WINDSHIELD WIPER ARM

Israel Nesson, Swampscott, Mass., assignor to Max Zaiger, Swampscott, Mass.

Application December 10, 1943, Serial No. 513,697

6 Claims. (Cl. 287—53)

This invention relates to windshield wiper arms and pertains more particularly to articulated, telescoping wiper arms of the general type described in Zaiger Patents Nos. 2,245,244, June 10, 1941; 2,295,620, September 15, 1942; and 2,312,278, February 23, 1943.

The principal purpose of the invention is to provide a wiper arm of this type having improved coupling means for securely connecting one end of the arm to the shaft of a windshield wiper motor. In one form, the improved coupling is of the type which permits easy attachment and removal of the arm by operating a readily accessible nut; and in another aspect the coupling involves a locking element operated by a readily accessible screw and which releasibly secures a longitudinally slidable bushing member within a socket forming part of the coupling. The slidable bushing is common to both forms of coupling, and the locking element affords auxiliary security in the first form and primary security in the second form.

Another object of the invention is to improve the construction and arrangement of the telescoping extension bars, the flat spring members which retain the extension bars in adjusted relation, and the tension spring which normally urges the articulated arm body to swing at an angle with respect to the coupling member and toward the windshield with the desired degree of adjustable pressure. The novel features satisfying this purpose will be hereinafter described and particularly pointed out in certain of the appended claims.

A further object of the present invention is to provide a pivoted terminal or end piece of the character described and claimed in said Patent No. 2,245,244, but equipped with an improved lock plate which affords a firm, immovable bearing for the adjusting screw and thereby ensures a more secure and efficient clamp for holding the terminal in its angularly adjusted position.

Still another feature of the invention resides in the improved adjusting means for regulating the operative effect of the tension spring which controls the pressure of the wiper blade normally carried by the aforesaid terminal, against the surface of the windshield. The new adjusting devices comprise a rocking lever pivoted at the hinge connecting the coupling member to the arm body; a screw adjustment engaging one side of the lever; and a roller at the other side of the lever arranged to engage the end of the tension spring in one embodiment of this invention.

Recommended embodiments of the invention are illustrated in the accompanying drawings, but it will be understood that the structural details of the devices herein shown and described may be varied to suit particular conditions without departing from the essence of this invention as defined in the appended claims. In the drawings;

Fig. 1 is a plan view of one form of the improved wiper arm;

Fig. 2 is a longitudinal section thereof;

Fig. 3 is a bottom view of the arm of Figs. 1 and 2, but showing an optional form of end piece or terminal;

Fig. 4 is an enlarged section taken on line 4—4 of Fig. 2;

Fig. 5 is a fragmentary longitudinal section through the coupling and arm body, illustrating a modified form of tension spring;

Fig. 6 is an enlarged diametrical section of a bushing forming part of the coupling shown in Fig. 2;

Fig. 7 is a bottom view of Fig. 6;

Fig. 8 is a section on line 8—8 of Fig. 7;

Fig. 9 is an enlarged detail plan view of the pivoted terminal shown in Figs. 1 and 2;

Fig. 10 is a fragmentary sectional view similar to Fig. 5, but showing an optional form of bushing for a pin type coupling; and Fig. 11 is an enlarged section on line 11—11 of Fig. 10.

In the particular embodiments chosen for the purpose of illustrating the several novel features of this invention, the improved wiper arm comprises a coupling member indicated generally at 11; a channeled arm body 12 hinged to the coupling member at the pivot 13, an intermediate, channeled extension bar 14 slidable within the channeled body 12, a flat secondary extension bar 15 slidable within the channeled bar 14, and an end piece or terminal 16 disposed at the outer end of the bar 15 and adapted for attachment to a windshield wiper blade. The terminal 16 is preferably pivoted to said bar at 17 so that it may be swung angularly to adjust the angular position of the wiper blade with respect to the wiper arm.

The aforesaid elements of the wiper arm are customarily stamped from sheet metal, and their general arrangement and function in an articulated, telescoping arm of the character herein illustrated is well understood. The improved features about to be described relate to the construction or arrangement of parts in one or another of the aforesaid main elements of the arm, and it will be appreciated that certain of these features may be embodied in other types of wiper arms. It will be apparent on the other hand that when the several features are combined in a single instrument as herein recommended, each cooperates with the other and contributes to the most efficient production and performance of the arm as a whole.

In accordance with this invention the stamped out body 11 of the coupling member is provided with a clamp or socket piece 18 fitting within the rounded end of said body and having a tab portion 19 underlying the flat top of said body and secured thereto by a stud 20. The socket 18 is adapted to receive a bushing 21 (Figs. 2 and 6) or an optional bushing 81 (Figs. 10 and 11), and a lock member 22 fixed to the base of the stud 20 and having a finger portion 23 engageable under the rim of the socket 18 and bushings 21 or 81 is provided releasably to latch the bushing within the socket. The stud 20 has a screw head 24 accessible on top of the coupling body 11 for turning the stud and thus moving the locking finger 23 angularly to and from its latching position.

In the construction illustrated in Figs. 1 to 3, the bushing lock 22 serves an auxiliary function, for the coupling is held on the motor shaft by a nut as hereinafter described; but with the alternate, pin-type bushing 81 shown in Figs. 10 and 11, the bushing lock is necessary to prevent longitudinal movement of the bushing in the socket 18 within which it is keyed for sliding movement during assembly.

The socket clamp 18 and bushings 21 or 81 form part of the coupling devices for connecting the wiper arm to the shaft 25 of the usual wiper motor. As best shown in Figs. 6 to 8, the bushing 21 is stamped from sheet brass or other metal to provide an annular inturned shoulder or ring 26 at one end, the opening 27 of the inturned shoulders being substantially smaller than the bore of the bushing itself. The exterior of the bushing 21 and the interior of the socket 18 are preferably serrated or otherwise formed to provide mutually interfitting parts which restrain relative rotation while permitting the bushing to be slid axially into the socket. The serrations of the socket are indicated at 38 (Figs. 5 and 11), and the serrations of bushing 21 at 39 (Fig. 6).

A cup-shaped bushing insert 28 preferably made of hardened steel and having a cylindrical rim formed with pointed teeth 29 and a base opening 30 with a serrated edge, fits closely within the bushing 21 with its serrated rim 29 engaging the inturned ring 26 (Fig. 2). The opening 30 of this insert receives the customary tapered shoulder 31 of the motor shaft 25, and the top of the coupling body 11 is apertured at 32 (Fig. 5) to receive the end of said shaft when this type of coupling member is applied thereto.

This coupling is secured to the shaft by a nut 33 which threads on the projecting end of the shaft 25. By tightening this nut against the outer surface of the inturned bushing ring 26, the insert 28 is drawn toward said ring by the engagement of the tapered shoulder 31 therewith, so that the teeth 29 of the insert bite into the inner surface of said bushing ring and the teeth 30 of the insert bite into the tapered shoulder of the shaft, thus preventing relative rotation between the shaft, the insert and the bushing 21. The bushing is keyed to the interior of the socket member 18, as aforesaid, so that the coupling body 11 to which the socket 18 is affixed will be swung angularly as a result of the ordinary, reciprocal rotation of the motor shaft.

Relative longitudinal movement between the socket and bushing is prevented by turning the bushing lock 22 to latching position, as aforesaid. This latch obviates any likelihood that the arm coupling will be accidentally pulled or blown off the bushing and shaft, especially when the pin-type bushing is employed. As previously suggested, the socket member 18 is adapted to receive a bushing for either the screw type or pin type coupling. The pin-type connection is shown in Figs. 10 and 11. In that form, a thick-walled bushing 81 is fastened to a plain ended shaft 82 by a pin 83 passing through aligned radial openings in the shaft and bushing. The pin thus holds the bushing against rotational or longitudinal movement on the shaft. The exterior surface of the bushing 81 is serrated, as indicated in Fig. 11, to provide longitudinal ribs and grooves which fit complemental grooves and ribs 38 on the serrated inner surface of the socket 18, thereby keying the bushing to the socket and preventing relative rotation therebetween. Relative longitudinal movement of said parts is prevented by the movable locking member 22, as explained above and shown in Fig. 10.

The telescoping action of the extension bars 14 and 15 is restrained by leaf springs which hold these bars in the adjusted positions to which they may readily be moved by hand. The intermediate extension bar 14 is box-shaped in cross section throughout its length, the bottom margins 41 of the channeled metal body being turned in against each other. The arm body 12 also has a box-shaped portion formed by the inturned bottom margins 42.

An intermediate extension bar spring 43 fits between the bottom wall 41 of the bar 14 and the bottom wall 42 of body 12, and has an end tab 44 and a shoulder 45 engaging opposite ends of said bottom wall 42, thereby to prevent relative longitudinal movement of the body 12 and spring 43 which bears against the intermediate extension bar and restrains its sliding movement.

Somewhat similarly, an extension bar spring 46 fits between the under side of the bar 15 and the bottom wall 41 of the bar 14, and has end tabs 47 and 48 engaging the opposite ends of the bottom wall 41 to hold the spring in operative position to bear against the bar 15 and restrain its sliding movement. The downwardly projecting tabs 47 and 48 also serve as stops to limit longitudinal movement of bar 14 by engaging the spring end 44 and spring shoulder 45 respectively. Outward movement of bar 15 is limited by the engagement of a stud stop 49 of the bar with a shoulder 50 formed at the inner end of a bowed portion of spring 46, as indicated in Fig. 2.

The pivoted, telescoping arm is pressed toward the windshield on which it is mounted and normally urged to swing at an angle with respect to coupling 11, as shown in Figs. 1 to 3, by a tension spring 51 here shown as composed of two superposed leaves both secured to the inner portion of spring 43 by a rivet 52 or other fastening. Inwardly bent tabs 57 of the arm body 12 afford a fulcrum for the tension spring members; and the rearward end of tension spring 51 engages a roller 53 carried by a rocker lever 54 having sides which receive and swing on the arm pivot 13, in the form shown in Fig. 2.

The action of the tension spring tends to swing the arm inwardly, toward the windshield, with respect to the coupling 11, and the degree of tension may be varied by providing an adjusting screw 55 which threads in a trunnion nut 56 carried by the rocker lever 54, and thus regulates the position of the lever and of its roller 53 relative to the coupling 11.

An optional form of tension spring is illustrated in Fig. 5 which shows a coiled spring 61 connected at one end to the rear end of a shortened intermediate extension bar spring 43', and connected at its other end to a modified form of rocker lever 62. In this case the lever sides have notches 63 removably receiving the pivot pin 13, so that the rocker and spring may be applied after the arm body 12 is hinged to the coupling member 11. The position of the lever 62 may be regulated to adjust the tension of the coiled spring 61 by the screw and nut arrangement just described.

The pivoted terminal 16 at the outer end of the extension bar 15 in Figs. 1 and 2 operates in the manner described in Zaiger Patent No. 2,295,620, but is here provided with an improved feature which ensures a more secure clamping action and greater ease and rapidity of adjustment. As best shown in Figs. 2 and 9, a fan-shaped portion 71 of the end piece 16 rests upon and slides angularly over the end of bar 15 to which it is pivoted, and a lock plate 72 also connected at one end by the stud 17 bears on the top of the fan portion 71. The terminal adjusting screw 73 passes through a small hole at the rearward end of the plate 72 and through an arcuate slot 74 of the terminal, and threads into an opening in the bar 15. Thus, the fan portion of the terminal 16 may be swung on its pivot between the bar 15 and plate 72, while the screw 73 is loosened, but is securely clamped between said members when the screw is tightened. As the screw head engages a relatively large bearing surface on the stationary lock plate, strain upon the pivoted terminal has no tendency to cause the screw to loosen accidentally. Hence, the angular adjustment of the terminal is securely fixed without excessive tightening of the screw, and the adjustment may be varied when desired without difficulty.

It will be understood, as aforesaid, that the structural details of the wiper arms selected for the purpose of illustrating the present invention may be varied to suit special conditions while retaining the essential features of novelty set forth in the following claims.

I claim:

1. In a windshield wiper arm, a shaft coupling comprising a socket, a bushing fitting within the socket, the opposed surfaces of the socket and bushing having interfitting portions preventing relative rotation therebetween while permitting longitudinal movement of the bushing in the socket, and locking means having a finger angularly movable into position at the end of the socket to limit said longitudinal movement and prevent removal of the bushing from the socket.

2. In a windshield wiper arm, a shaft coupling comprising a socket, a bushing fitting within the socket and adapted to be fastened onto a motor shaft, the opposed surfaces of the socket and bushing having interfitting serrations preventing relative rotation therebetween while permitting longitudinal movement of the bushing in the socket, a locking member having a finger angularly movable into operative position across the ends of the socket and bushing to limit said longitudinal movement and prevent removal of the bushing from the socket, and means accessible on top of the coupling for moving said locking member to operative and inoperative positions.

3. In a windshield wiper arm, a shaft coupling comprising a socket, a bushing fitting within the socket and having an inturned annular flange at one end, an insert fitting within the bushing and having a rim engaging said flange, the insert having an opening engaging a shouldered portion of the shaft, a nut threading on the shaft end and bearing on the bushing flange thereby to draw the insert against said flange, opposed surfaces of the socket and bushing having interfitting serrations preventing relative rotation therebetween, and a manually operable locking member for preventing endwise removal of the bushing from the socket.

4. In a windshield wiper arm, a shaft coupling comprising a socket, a bushing received in the socket and having an inturned flange portion at one end, a cup-shaped insert fitting within the bushing and having a toothed rim bearing on said flange portion and a toothed opening engageable with a shouldered portion of the shaft, the insert being of harder material than the bushing so that its rim teeth bite into the bushing flange when the shaft shoulder is drawn into the insert opening by tightening a nut threaded on the shaft and bearing on the flange end of the bushing.

5. In a windshield wiper arm, a shaft coupling comprising a socket, a bushing received in the socket and having an inturned ring portion at one end, a cup-shaped insert fitting within the bushing and having a toothed rim bearing on said ring portion and a toothed opening, a motor shaft extending through said toothed opening and through said ring portion, the shaft having a tapered shoulder engaged by said toothed opening, and a nut threaded on the end of the shaft and tending when tightened to force the insert rim against the ring portion of the bushing with binding engagement and to expand the bushing against the socket.

6. In a windshield wiper arm, a shaft coupling comprising a socket, a bushing received in the socket and having an inturned ring portion at one end, a cup-shaped insert fitting within the bushing and having a toothed rim bearing on said ring portion and a toothed opening engageable with a shouldered portion of the shaft, the insert being of harder material than the bushing so that its rim teeth bite into the bushing ring portion and tend to expand the bushing against the socket when the shaft shoulder is drawn into the insert opening by tightening a nut threaded on the shaft and bearing on the ringed end of the bushing, the coupling having a lock member pivoted thereto and provided with a latching finger movable over the end of the bushing to prevent endwise removal of the bushing from the socket.

ISRAEL NESSON.

REFERENCES CITED

The following references are of record in the file of this patent:

UNITED STATES PATENTS

| Number | Name | Date |
| --- | --- | --- |
| 2,312,278 | Zaiger | Feb. 23, 1943 |
| 1,694,245 | Baker et al. | Dec. 4, 1928 |
| 2,289,552 | Rousseau | July 14, 1942 |
| 2,286,035 | Horton et al. | June 9, 1942 |
| 1,016,653 | Steinbrenner | Feb. 6, 1912 |
| 2,315,350 | Rappl | Mar. 30, 1943 |
| 1,884,491 | Ziemann | Oct. 25, 1932 |
| 2,215,371 | Horton | Sept. 17, 1940 |
| 2,312,279 | Zaiger | Feb. 23, 1943 |

FOREIGN PATENTS

| Number | Country | Date |
| --- | --- | --- |
| 2,041 | British | Dec. 12, 1891 |